Oct. 25, 1927.
G. A. SCHAEFER
1,646,599
APPARATUS FOR REMOVING FLUID FROM WELLS
Filed April 30, 1925
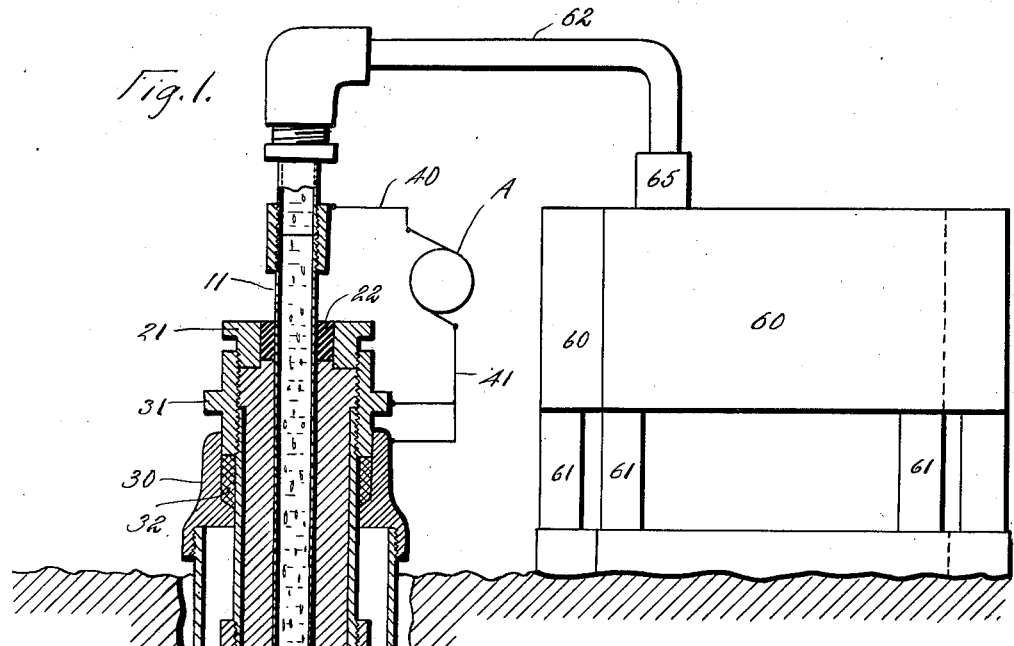
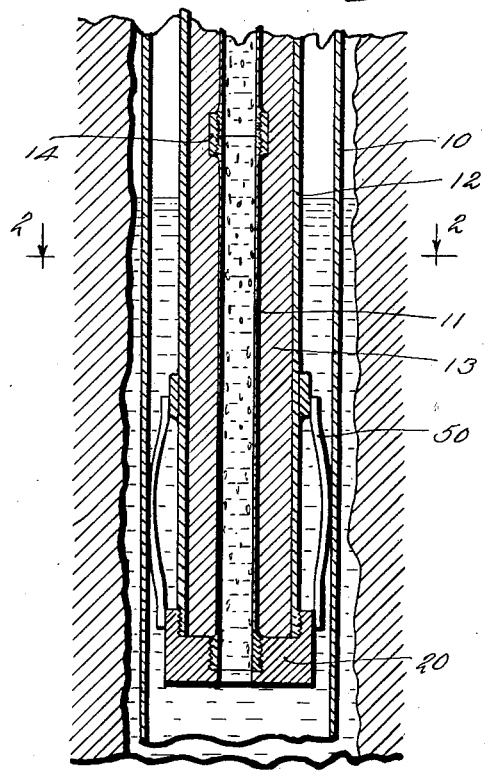
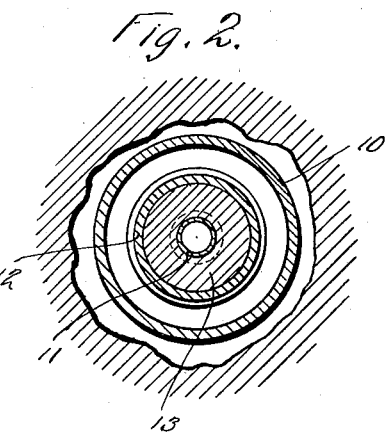
Inventor
George A. Schaefer
by W. K. Maxwell
Attorney Patented Oct. 25, 1927.

1,646,599

UNITED STATES PATENT OFFICE.

GEORGE A. SCHAEFER, OF LOS ANGELES, CALIFORNIA.

APPARATUS FOR REMOVING FLUID FROM WELLS.

Application filed April 30, 1925. Serial No. 26,883.

This invention relates to a method and apparatus for removing fluid from a well.

It is common practice to employ mechanical means in the form of pumps for removing fluid from wells. In many situations, for instance, in the case of deep wells, such as oil wells, these mechanical means have disadvantages which make them costly to maintain and operate and in many cases impractical.

It is an object of this invention to provide a method and means for removing fluid from a well by heat generated electrically, and without the use of working or relatively moving parts such as are found in the various mechanical devices heretofore used.

Another object of this invention is to provide a simple, inexpensive and practical form of apparatus for heating fluid in a well.

The various objects and features of my invention will be best and more fully understood from the following detailed description throughout which reference is had to the accompanying drawings in which Fig. 1 is a sectional view of a well having in it the apparatus provided by my invention and Fig. 2 is the transverse sectional view taken as indicated by line 2—2 on Fig. 1.

In accordance with the method provided by my invention I cause flow of fluid upwardly in a well by heating a body or column of fluid in the lower part of the well so that it rises and in some cases partially vaporizes, heating the fluid that takes the place of the heated fluid and maintaining the rising body in a heated condition so that it continues to rise until it flows from the top of the well.

In the drawings I have illustrated a well having the usual casing 10 arranged therein. The casing 10 is in accordance with well known practice perforated at its lower end, or is otherwise provided with means whereby the fluid entering the well passes into the lower part of the casing where it rises to the level of the fluid in the well as indicated in Fig. 1 of the drawings. I have not illustrated the perforated casing or other construction provided at the lower end of the well casing as my invention is not concerned with such matters.

In accordance with my invention I provide means for heating a body of fluid in the well or in the casing 10, in the well, so that the body rises, and for continuing to heat or maintain the body in a heated condition so that it continues to rise, and heating fluid which takes the place of the fluid as it rises so that a column or stream of heated fluid flows upwardly to the top of the well. The heating means or heater as I may term it, includes, generally, a heating element in the form of a tube 11 extending from the top of the well downwardly into the fluid standing in the well and open at its lower end to receive the fluid. The heating element is carried or supported by a pipe 12 which surrounds it and is insulated from it by a body of insulation 13.

In accordance with my invention the heating tube forms a conduit for the heated column or body of fluid being removed from the well. The tubing employed in the formation of the heating element is such as to have a comparatively high electrical resistance, for instance, it is comparatively thin and formed of material, for instance, a metal, which is not a particularly good conductor so that it has a comparatively low conductive capacity. In the particular construction shown in the drawings I have employed thin sections of tubing upset at their ends to be joined by couplings 14. Further, in accordance with my invention I may in some cases form the heating element so that it is heated to various degrees at various points along its length. For instance, I may vary the conductive capacity of the element at various points along its length so that the various points are heated to different degrees. This variation or difference in conductive capacity in various parts of the heating element may be obtained in various ways, for instance, by varying the material employed in various parts of the element or in varying the thickness or size of the element to change its cross sectional area. The last mentioned means is the most practical, for in practice tubing of various thicknesses may be very easily provided at various parts of the element thereby obtaining the desired action. It is usually desirable to form the heating element so that it becomes heated most at its lower end and decreases in its degree of heat as it approaches the top of the well. The reason for this is that the fluid absorbs considerable heat from the element until it becomes hot, but requires less heat to maintain it hot.

The supporting pipe is, of course, sufficiently heavy and strong to effectively and properly support the heating tube and may be employed as an electrical conductor as will be hereinafter described in which case it is made to have an electrical conductivity sufficient to carry the current employed without heating. In practice the supporting pipe 12 may be ordinarily formed of ordinary pipe or casing. The supporting pipe is sufficiently large in diameter to freely carry the heating tube so that there is no flow of electricity between the support and tube at points between the bottom and top of the well. The tube and supporting pipe are connected at their lower ends in the proper spaced relation and also electrically by a suitable fitting 20 into which the lower ends of the tube and support are screw threaded as shown in the drawings. At the top of the well the heating tube and supporting pipe may be maintained in the proper spaced relation by a fitting or cap 21 which closes the upper end of the pipe and is electrically insulated from the heating tube by insulation 22.

The supporting pipe may be slidably carried in a fitting 30 applied to the upper end of the well casing and a collar 31 may be applied to the pipe to be supported by packing 32 arranged in a gland formed in the fitting 30. With this construction the weight of the pipe keeps the packing tight.

The insulation 23 arranged between the heating tube and carrier operates to maintain the heating tube and support in the proper spaced relation between the fitting 20 and cap 21, to insulate the heating tube and support electrically, and to insulate the heating tube against the radiation of heat. It will be obvious that I may in practice use a variety of materials for this purpose, for instance, a material such as asbestos or a compound of asbestos and manganese may be advantageously used.

The electrical circuit provided for heating the heating tube 11 may comprise any suitable source of electrical energy such, for instance, as a generator A having one pole connected with the heating tube at the top of the well, for instance, by a suitable electrical connection 40 and its other pole grounded, for instance, connected with the supporting pipe 12 by a connection 41. In the drawings I have illustrated the connection 41 connected with the fitting 30 and collar. With this arrangement the heating tube 11 and support 12 conduct the current generated by the generator A, the current passing between the heating tube and support through the fitting 20 connecting their lower ends. As before stated the support has sufficient electrical conductivity that it does not become heated, while on the other hand the heating tube has such conductivity or resistance as to become heated. It will be apparent that the desired heating of the tube 11 may be obtained by proper proportioning of the conductivity of the tube and the current passed through it.

A plurality of leaf springs 50 may be carried by the lower portion of the support 12 to engage the well casing to space the support in the casing and form an electrical connection between the lower end of the support and the casing so that the well casing as well as the support may operate as a conductor for one side of the circuit. This also electrically connects the well casing and support to prevent electrolitic action that might otherwise occur.

Various means or arrangements may be provided at the upper end of the heating tube for conducting or distributing the fluid flowing out of the tube. In the drawings I have illustrated a particularly simple and practical arrangement wherein there are two spaced receiving tanks 60 carried on supports 61 which electrically insulate them from the ground. A distributing arm 62 is swivelly mounted on the upper end of the tube so that it can be swung into position over either tank. The outer end of the distributing arm 62 may be connected with the tanks through a non-conductive coupling, for instance, a wooden coupling 65. The arm should be covered with insulation to make the apparatus safe.

In operation the apparatus which I have described is arranged in the well in the manner illustrated in the drawings so that the heating tube and support therefore are electrically connected only at their lower ends. When the proper electrical connections have been made with the upper end of the heating tube and the grounded parts such as the support, and a suitable electrical current is passed through the circuit thus made, the heating tube becomes heated uniformly throughout its length, if its resistance is uniform, and to varying degrees at various points along its length if its resistance varies at different points. The fluid in the lower part of the tube is heated and becomes lighter than the fluid not in the tube and therefore is forced upwardly somewhat in the tube. The fluid entering the tube to force the heated fluid upwardly becomes heated and it is in turn moved upwardly by other fluid entering the tube. As this action goes on, a certain amount of the fluid may be vaporized forming bubbles which, of course, tend to rise and aid in the movement of the fluid upwardly in the tube. As the fluid rises in the tube it is maintained in the heated condition or is further heated so that it continues to rise and be vaporized until it reaches the top of the well where it discharges through the distributing arm 62 into the receiving tanks 60. It will be obvious of course that the distributing arm may be transferred between the receiving tanks as they become filled.

Having described only a typical preferred form of my invention I do not wish to limit myself to the specific details set forth, but wish to reserve to myself any changes or variations that may appear to those skilled in the art or fall within the scope of the following claims:

Having described my invention, I claim:

1. Apparatus to be arranged in a well including, a fluid conduit to extend from the top of the well into the fluid in the well, the conduit forming a part of an electric circuit and being of such electrial resistance as to be heated by flow of electricity through the circuit, and heat insulation around the conduit.

2. Apparatus to be arranged in a well including, a fluid conduit of low electrical conductivity to extend from the top of the well into the fluid in the well, and means whereby the conduit forms a part of an electric circuit, the conductivity of the tube being less at one point than another.

3. Apparatus to be arranged in a well including two tubular members, one within the other, adapted to extend into the well, the members being electrically connected only at their lower ends and the inner member being of low electrical conductivity.

4. Apparatus to be arranged in a well including two tubular members, one within the other, adapted to extend into the well, the inner member forming a fluid conduit and being of low electrical conductivity and the outer member forming a support for the inner member, and means whereby the members are electrically connected only at their lower ends.

5. Apparatus to be arranged in a well including two tubular members, one arranged within the other, an electrical connection between the members only at the lower ends of the members, and insulation between the members, the inner member being of low electrical conductivity.

6. Apparatus to be arranged in a well including a fluid conduit to extend into the well, the conduit being of low electrical conductivity, and a support for the conduit electrically insulated therefrom except at the lower end of the tube.

7. Apparatus to be arranged in a well including a fluid conduit to extend into the well, the conduit being of low electrical conductivity, a support for the conduit electrically insulated therefrom except at the lower end of the tube, and means forming a ground connection between the lower part of the support and well.

8. Apparatus to be arranged in a well including a fluid conduit extending into the well, a support for the conduit including a pipe surrounding the conduit, a fitting connecting the lower ends of the pipe and conduit, heat and electrical insulation between the pipe and conduit, and means whereby the pipe and conduit are connected in an electrical circuit so that the conduit is heated by flow of electricity therethrough.

In witness that I claim the foregoing I have hereunto subscribed my name this 25th day of April, 1925.

GEORGE A. SCHAEFER.